Feb. 6, 1968     S. L. JAVNA ET AL     3,367,337
SURGICAL CLAMP

Filed Jan. 15, 1965     2 Sheets-Sheet 1

INVENTORS
STEPHEN L. JAVNA
RICHARD B. BERLIN
BY
Morgan, Finnegan, Durham Pine
ATTORNEYS Feb. 6, 1968 S. L. JAVNA ET AL 3,367,337
SURGICAL CLAMP
Filed Jan. 15, 1965 2 Sheets-Sheet 2
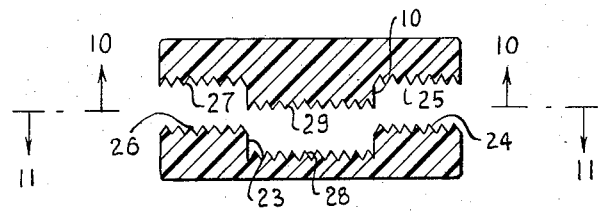
FIG. 9.
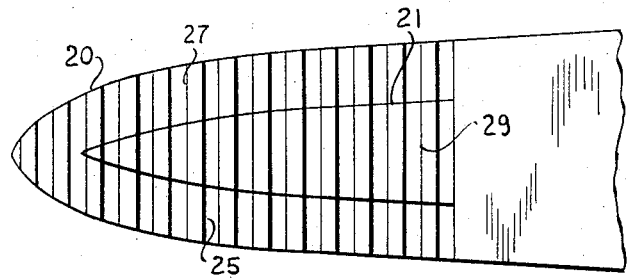
FIG. 10.
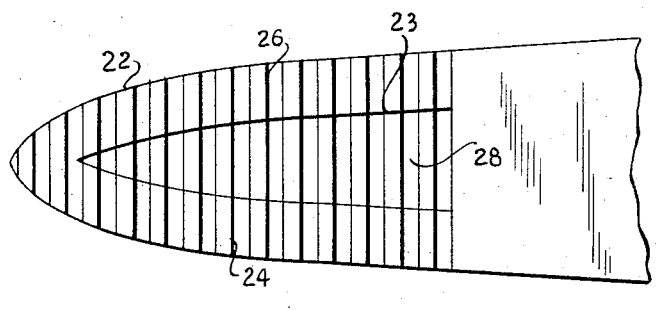
FIG. 11.
FIG. 14. 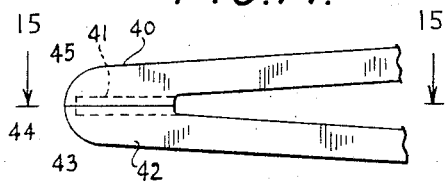 FIG. 12. 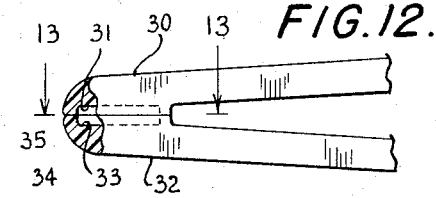
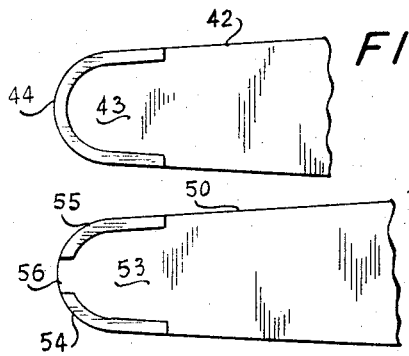
FIG. 15.
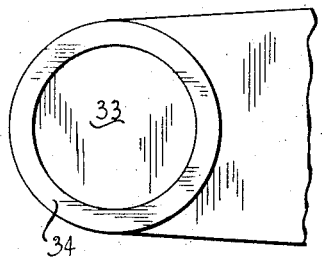
FIG. 13.
FIG. 16.
INVENTORS
STEPHEN L. JAVNA
RICHARD B. BERLIN
BY
Morgan Finnegan Durham & Pine
ATTORNEYS United States Patent Office 3,367,337
Patented Feb. 6, 1968

3,367,337
SURGICAL CLAMP
Stephen L. Javna, 33 Edgewood St., Tenafly, N.J. 07670, and Richard B. Berlin, 166 Norma Road, Teaneck, N.J. 07666
Filed Jan. 15, 1965, Ser. No. 425,847
13 Claims. (Cl. 128—325)

The present invention relates to new and improved surgical devices and, in particular, relates to a surgical clamp, such as a hemostat, surgical clamp-ligature applicator combinations, and sterile packages thereof.

Heretofore, clamps employed during surgery, as well as many other surfical implements, were made of metal or other durable material suitable for repeated cleanings and sterilizations. After each use, the clamps of the type heretofore known were cleaned and sterilized prior to re-use in subsequent operations. These known clamps, furthermore, were relatively complicated in structure and required a cumbersome manipulation to properly position them in the hand or on the fingers of the surgeon prior to application.

The Halsted clamp, which heretofore has been a most commonly used hemostat, resembles a pair of pliers in that it utilizes two pivoted arms having cooperating jaws at one end. It also has finger loops, similar to those found in a pair of scissors, located at the opposite ends from the jaws. In addition, the Halsted clamp includes a ratchet and pawl mechanism for holding the jaws in a fixed relation to each other. The Halsted clamp functions well to securely close off blood vessels during surgery. However, because of its construction, it is difficult to handle and it crushes the blood vessel being clamped. Because of the several cooperating parts of the Halsted clamp, and because of the necessity for cleaning and sterilizing the clamp, high quality metals and precision manufacturing techniques are necessary. For that reason, the Halsted clamp is an expensive instrument.

In addition, it has heretofore been a difficult and cumbersome procedure to apply ligatures, when necessary, to the object being held by the heretofore known clamps. In most cases, the blood vessel or other object being held by the clamp is in a confined area surrounded by delicate organs or tissues. The ligation of blood vessels, consequently, must be performed with care so as not to damage surrounding organs, tissues or other objects, and, of course, without disturbing other surgical devices or instruments which may be in the near vicinity. In many instances, ligatures must also be applied quickly since time, obviously, is of the essence during surgery. The surgical clamps and ligatures heretofore known frequently could not be applied efficiently and expeditiously under the conditions imposed by surgery.

The application of ligatures to organs and tissues held by Halsted clamps may be especially troublesome because the ligature may become snagged on the box joint about which the arms of that clamp pivot. Slight burrs on the joint may also render the Halsted clamp inoperative.

It is a principal object of this invention to provide an inexpensive, disposable surgical clamp which is easy to use, effective and safe to use without fear of damaging the object, e.g., a blood vessel, to which it is applied, or damaging delicate ligature material while tying.

Another object is the provision of a lightweight surgical clamp which is shaped to fit the hand and which is capable of being manipulated with one hand only once it has been placed in said hand without the necessity of groping, looking or feeling for finger loops and the like.

Another object is the provision of a surgical clamp which is easy to use with either hand and which provides a firm grip thereto.

A further object is the provision of a surgical clamp wherein the force capable of being applied by the gripping jaws thereof during manipulation can be pre-set, or established, during the manufacture of the clamp such that excessive pressures of the jaws on the object being clamped is effectively averted.

Another object is the provision of a surgical clamp made of a one-piece molding of non-allergenic, radio-opaque plastic materials which can be readily cleaned automatically and packaged mechanically to avoid contamination.

Another object is the provision of a disposable, or reusable, one-piece plastic surgical clamp which is substantially free of stresses during storage and which can be readily placed into operative condition just prior to use, thereby assuring constant pressure from clamp to clamp of the same type.

Another object is the provision of a surgical clamp-ligature applicator combination which permits the easy application of ligatures to the object being held by the clamp.

Further objects and advantages will be apparent from the following detailed description of several specific embodiments of the invention taken in conjunction with the appended drawings, in which:

FIGURES 9–16 are illustrations of different jaw configurations which may be used in accordance with the surgical clamp of this invention;

FIGURE 9 is a cross-section of a pair of mating jaws in the open position;

FIGURE 10 is a view of the inner surface of the upper jaw of FIGURE 9, as viewed from line 10—10 of FIGURE 9;

FIGURE 11 is a view of the inner surface of the lower jaw of FIGURE 9, as viewed from line 11—11 of FIGURE 9;

FIGURE 12 is a fragmentary side elevation, partially in section, of another embodiment of the jaws, shown in the closed position;

FIGURE 13 is a plan view of the lower jaw of FIGURE 12, as viewed from line 13—13 of FIGURE 12;

FIGURE 14 is a fragmentary side elevation of a further embodiment of the jaws, shown in the closed position;

FIGURE 15 is a plan view of the lower jaw of FIGURE 14, as viewed from line 15—15 of FIGURE 14; and FIGURE 16 is a fragmentary plan view of yet another embodiment of jaw structure.

Figure 1:
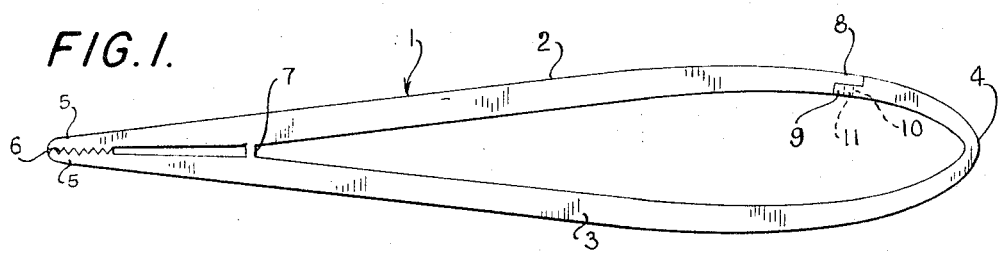
FIGURE 1 is a side elevation of a novel surgical clamp according to this invention.
Figure 2:
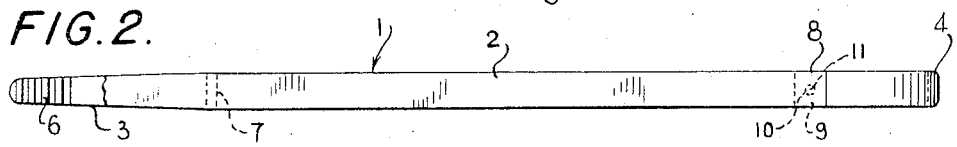
FIGURE 2 is a top plan view, partially cut away, of the surgical clamp shown in FIGURE 1, wherein a part of the upper jaw thereof is broken away.
Figure 3:
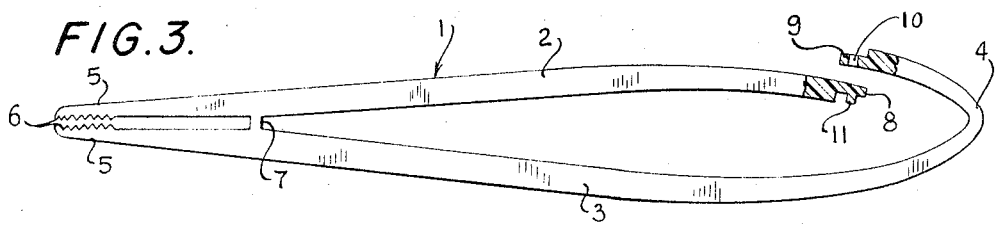
FIGURE 3 is a side elevation, partially in section, of the clamp shown in FIGURE 1, wherein the means for joining the free ends of the upper arm are shown in section and wherein said clamp is shown in its relaxed condition for storing.

Referring specifically to FIGURES 1 through 4, the novel surgical clamp of this invention comprises a unitary member 1 formed of a resilient material, such as polypropylene, high impact polystyrene, nylon, high density polyethylene, and the like. The unitary member 1 is formed with a pair of elongated, longitudinally bowed arms, upper arm 2 and lower arm 3, which are joined at one end by a hinge portion 4. The thickness of the hinge portion 4 determines, to a substantial extent, the sensible stiffness of the clamp, that is, the effort required to open and close the jaws. For example, the thinner the hinge portion, the smaller the effort required to operate the jaws, whereas an increase in the thickness of the hinge portion, the greater the required effort. At the other end, the arms 2 and 3 terminate in gripping jaws 5 having opposing gripping surfaces 6 which may, for example, be serrations. The unitary member 1 is further formed with a fulcrum 7 joining arms 2 and 3 at a point spaced from hinge portion 4 and jaws 5.

According to one embodiment of this invention, the upper arm 2 is split at a point spaced from and between hinge portion 4 and fulcrum 7, so as to provide free end 8 connected directly to said fulcrum and free end 9 connected directly to said hinge portion. When the surgical clamp is in condition for use, the free ends 8 and 9 overlap each other with free end 9 being disposed inwardly over free end 8 and bearing outwardly against said free end 8. The free end 9 is formed with a hole 10 and free end 8 is formed with a pin 11 adapted to mate with hole 10 and retain said free ends in joined condition, thereby preventing lateral or longitudinal shifting of one free end in respect to the other when said clamp is in operative condition.

The novel surgical clamp as described above can be readily molded by any suitable technique, such as injection molding, compression molding, and the like, or it can be produced by a cutting operation which, of course, would be considerably more expensive than molding. In either event, the clamp, preferably, is formed in the shape as shown in FIGUE 3, in which shape no stresses are present within the structure of the clamp. In order to place the clamp into operative condition, free end 8 is lifted upwardly and moved laterally past free end 9. Free end 8 is then moved laterally over free end 9 and permitted to lower onto free end 9 such that pin 11 enters hole 10. In this position, the hinge portion 4 is in stressed condition and that portion of arm 2 between free end 9 and said hinge portion urges free end 8 upwardly, thus closing jaws 5 and the clamp assumes the condition as best illustrated in FIGURE 1.

Figure 4:
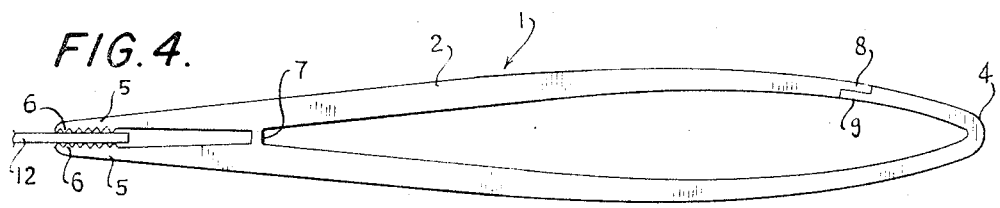
FIGURE 4 is a side elevation of the clamp shown in FIGURE 1 illustrating said clamp in operation.

In operation, the clamp, when in the operative condition as shown in FIGURE 1, is placed against the fingers of the hand of the user and the fingers are closed about arms 2 and 3. With the thumb against one arm and the fingers against the other ram of the clamp, said arms 2 and 3 are pressed toward each other, thus causing the jaws 5 to pivot about the fulcrum 7 into open condition. As shown in FIGURE 4, an object 12, such as a blood vessel, is disposed between the jaws 5 and pressure on the arms 2 and 3 is removed. The inner stresses developed by the material from which the clamp is formed will urge the arms adjacent to said hinge portion away from each other to cause jaws 5 to pivot in the reverse direction about fulcrum 7, thereby closing said jaws and applying the gripping surfaces 6 on the object 12.

It will be seen that the amount of pressure exerted by the jaws 5 on the object 12 is dependent upon the size and relative positions of the various parts of the above described clamp. So long as such relative sizes and relative positions are maintained constant from clamp to clamp, the amount of pressure exerted by jaws 5 on object 12 can be controlled and, in fact, pre-set during manufacture of the clamp. As a result, regardless of the particular strength or deftness of the user, each clamp will exert only the pre-set constant pressure on an object 12 of given size. It is, therefore, now possible and practical to manufacture clamps having a pre-set compression capability and to thereby reduce the amount of damage caused by excessive pressures and, yet, avoid insufficient pressures during surgical clamping.

When it is desired to release the clamping jaws 5 from the object 12, the arms 2 and 3 are again pressed toward each other, thereby pivoting jaws 5 about fulcrum 7 to open same and release object 12. The surgical clamp being made of inexpensive materials and being made by inexpensive procedures, may then be discarded, or used several more times during the same or other operations.

Figure 5:
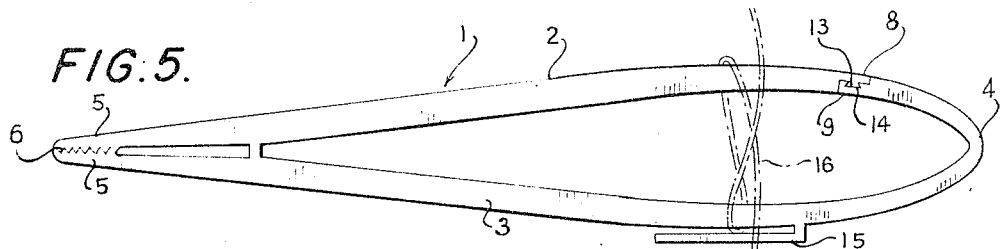
FIGURE 5 is a side elevation of a novel surgical clamp illustrating a different joining member for joining the free ends of one arm thereof and also illustrating a clip for holding surgical ligatures on said clamp.
Figures 6, 8:
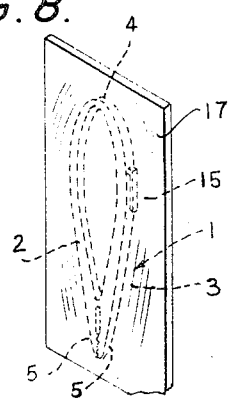
FIGURE 6 is a plan view, partially cut away, of the clamp shown in FIGURE 5, wherein the lower jaw is cut away.
FIGURE 8 is a perspective view of the clamp shown in FIGURE 1 as it would appear in a sterilized package.

Referring now to FIGURES 5 and 6, there is shown another embodiment of the surgical clamp of this invention, wherein the upper arm 2 is split to provide free ends 8 and 9 as described above. Free end 8, however, is formed with a flaring tenon 13 extending laterally across the underside thereof. The free end 9 is formed with a flaring mortise 14 adapted to receive the flaring tenon 13, thus joining said free ends together against longitudinal displacement. The unitary member 1 of FIGURES 5 and 6 is also formed with a clip 15 on one of the arms, as arm 3 thereof. The clip 15 is preferably pre-stressed against the arm 3 such that an object disposed between clip 15 and arm 3 will be pressed by said clip against said arm. A ligature loop 16 is shown encircling the unitary member 1 and being pressed by clip 15 against arm 3 to hold said ligature loop on the unitary member 1.

The clamping operation of the clamp shown in FIGURES 5 and 6 is substantially the same as that of the clamp shown in FIGURES 1 through 4. When it is desired to apply the ligature loop 16 to an object being held between gripping surfaces 6, said ligature loop is slipped along unitary member 1, past jaws 5 and onto the object being held thereby. The ligature loop 16 then is tightened up and secured on said object, and, if desired, the clamp may then be removed. It is to be noted that the clamp thus serves as a guide for placing the ligature loop 16 on the desired object and permits the application of ligatures to confined areas. The smooth plastic members of the clamp will, as will be understood, avoid snagging of ligatures.

Figure 7:
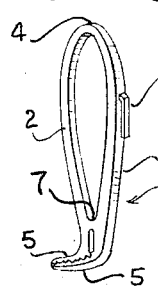
FIGURE 7 is a perspective view of another surgical clamp wherein the gripping jaws are bent at an angle to the plane of the main body of said clamp.

FIGURE 7 illustrates another embodiment which is the same as that shown in FIGURES 5 and 6, except that the lower ends of arms 2 and 3 are bent, in the area between jaws 5 and fulcrum 7, such that jaws 5 are disposed at an angle to the plane of the remaining portions of the unitary member 1. This permits access of jaws 5 into areas which would be difficult to reach or inaccessible to a straight clamp such as that shown in FIGURES 5 and 6.

FIGURE 8 illustrates a clamp, similar to that shown in FIGURES 5 and 6, sealed within a plastic package 17. In this instance, the clamp has been sterilized and placed within the sterile package 17 which, thereafter, was sealed. If desired, the package can also contain ligature loops 16 encircling the unitary member and held between clip 15 and arm 3. Such ligatures also are preferably in sterilized condition so as to preserve the sterile condition of the clamp and internal portions of package 17. If desired, the fluids usually found in sterile packages containing ligatures may be included.

The clamps, as disclosed above, can be made in a unitary construction or the various members, e.g., the arms, jaws, hinge portions, fulcrums, clips, etc., can be made separately and suitably attached one to the other in order to form the clamp. It is, however, preferable to form the clamp as a one-piece molding or unitary structure so as to avoid the inadvertent loss of one or more of the members and, of course, to avoid overlooking such pieces and leaving them within the incision. Gripping surfaces 6 can be smooth, serrated, knurled, cupped, or otherwise fashioned, to provide any desired type of gripping action.

The gripping characteristics of the jaws may be effectively varied to adapt the clamp for use on specific organs and tissues, by forming the jaws with shapes to accommodate such organs and tissues, and/or by varying the shape and size of the gripping surfaces of the jaws. Thus, the gripping force may be increased by reducing the area of the gripping surfaces of the jaws. In this way, the pre-set gripping force of a given clamp according to this invention may be applied over a smaller surface area. Conversely, the gripping force will be reduced by increasing the area of the jaw gripping surfaces.

FIGURES 9–16 illustrate different jaw configurations which may be applied to the clamp of this invention.

In FIGURE 9, there is shown an embodiment of a pair of jaws having mating tissue engaging surfaces. Jaw 20 is provided with a projecting portion 25 adapted to mate with a recess 23 in the opposing jaw 22. The use of jaws having a projection, as 25, mating with a recess, as 24, provides a jaw structure in which the gripping force may be applied over a relatively small area.

As shown in FIGURE 9, the opposed surfaces of the jaws, 24 and 25, 26 and 27, and 28 and 29, are provided with meshing teeth which, as illustrated in FIGURES 10 and 11, extend across the inner mating surfaces of each jaw. It should be understood that a pair of mating jaws need not be provided with teeth, serrations or other forms of non-slip surfaces extending entirely across the faces of the jaws. Thus, for example, a pair of jaws according to the embodiment shown in FIGURES 9–11 may be provided with non-slip surfaces only on the face 29 of projection 25 and the face 28 of recess 23. Alternatively, the faces of the projection 25 and the recess 23 may be relatively smooth and teeth provided only along the mating surfaces 25, 27 of jaw 20 and 24, 26 of jaw 22.

In FIGURES 12 and 13, there is shown, by way of illustration, another embodiment of a pair of jaws usable with the surgical clamp of this invention. According to this embodiment, each jaw 30 and 32 is provided with a substantially circular recess 31 and 33 surrounded by a rim 34 and 35, respectively. This type of jaw construction permits rotation of the clamp about an axis through the jaw while it is engaging the body tissue, thus permitting the clamp to be moved without disturbing the gripping action.

FIGURES 14–15 illustrate another embodiment of jaw construction. According to this embodiment, opposing jaws 40 and 42 are provided with a recess 41 and 43. Each recess has a projecting surface, as 44 and 45, which follows the contour of the end of each jaw. This will permit application of the gripping force over a small area corresponding to the area of the opposing projecting surfaces 44 and 45.

FIGURE 16 illustrates a modification of the jaw structure shown in FIGURES 14 and 15. In FIGURE 16, the projecting portion following the contour of the jaw is not continuous, but is provided with an opening 56. The opening 56 may be coplanar with the recess 53 formed between the projections 54 and 55. It should be appreciated that an opposing jaw may be provided with a projection intended to occupy the space 56 in jaw 50.

Many other different jaw configurations will occur to those having skill in the art and it is not intended that the surgical clamp of this invention be limited to any one form of jaw configuration. It will be obvious from what has been said heretofore that one jaw configuration may be more readily suited for use on a given organ or tissue than another jaw configuration. The relative ease of fabricating the surgical clamp of this invention, coupled with its low cost, will readily permit the availability of surgical clamps according to this invention having different jaw configurations adapted for special uses.

One-piece molding to form the clamps described above can be made of non-alergenic plastics, such as polypropylene, high impact polystyrene, high density polyethylene, nylon, and the like, and can be made cheaply enough to be disposeable after one use. This provides the added saving of avoiding subsequent handling, washing, sterilizing and re-use. A radio-opaque substance, or X-ray responsive material, can be incorporated within the plastic from which the clamp is made so as to permit easy location of the clamp in the event it has been inadvertently left within the body after closing of the incision and will avoid the necessity of re-opening the incision in order to determine whether or not a clamp has been left behind. When made of plastics, the clamps are lightweight, thereby avoiding the unnecessary application of undue pressures on delicate blood vessels or other parts or organs within the incision. If desired, however, clamps can be made of a surgical steel or other suitable metal or other resilient material.

The shape of the clamps of this invention is designed to fit the human hand and is adapted to be comfortably and firmly gripped like a pencil. This avoids unnecessary handling of the clamp and minimizes the opportunities for accidentally dropping the clamp and otherwise damaging equipment or the patient. The compression exerted by the jaws 5 of the above-described novel clamps can be accurately pre-set during manufacture of the clamp and the compression to be obtained by the clamp is preserved over long periods of storage since the various members of the clamp can be freed of stresses therein by disengaging free ends 8 and 9. This insures that from clamp to clamp, the same accurate pre-set compression is provided by the jaws 5, and unnecessary damage to the object being clamped, e.g., blood vessels or tissues, will be averted. The novel clamps of this invention, furthermore, are constructed with no sharp edges, or a minimum of sharp edges, and are lightweight so as to avoid cutting, tearing or catching in the event that the clamp is accidentally dropped into the incision or onto the patient.

Inasmuch as the novel surgical clamps are made of inexpensive plastics by means of an inexpensive procedure, such as injection molding, they may be cleaned automatically and wrapped mechanically in sterile packages to avoid contamination and to make them readily and quickly available for immediate use without the need for maintaining and operating expensive sterilizing equipment. After use, the novel clamp can be simply discarded. In addition, sterile ligatures can accompany the novel clamps in the sterile package. Such ligatures can be held on the clamp by means of clip 15 until ready for use, at which time the clamp cooperates with said ligatures to guide them onto the object being held by the clamp. By this technique, the ligature is placed in position on the object being clamped and is ready to be tightened onto said object.

The particulars of the foregoing description are provided merely for purposes of illustration and are subject to a considerable latitude of modification without departing from the novel teachings disclosed herein. Accordingly, the scope of this invention is intended to be limited only as defined in the appended claims, which should be accorded a breadth of interpretation consistent with this specification.

We claim:

1. A surgical clamp, comprising: a unitary member having a pair of elongate, resilient, longitudinally bowed arms connected at one end by a hinge portion and terminating in a pair of cooperating gripping jaws at the other end thereof, and a fulcrum joining said arms at a point spaced from both ends thereof, one of said arms being split at a point between said fulcrum and said hinge portion to form two joinable free ends.

2. The surgical clamp described in claim 1 in which said hinge portion is thinner than said arms.

3. A surgical clamp, comprising: a member having a pair of elongate, resilient, longitudinally bowed arms connected at one end by a hinge portion and terminating in a pair of cooperating gripping jaws at the other end thereof, and a fulcrum joining said arms at a point spaced from both ends thereof, one of said arms being split at a point between said hinge portion and said fulcrum to form two joinable free ends, and means for retaining said free ends in joined condition.

4. A surgical clamp, comprising: a member having a pair of elongate, resilient, longitudinally bowed arms connected at one end by a hinge portion and terminating in a pair of cooperating gripping jaws at the other end thereof, and a fulcrum joining said arms at a point spaced from both ends thereof, one of said arms being split at a point between said hinge portion and said fulcrum to form two joinable free ends, one said free end connected to said hinge portion being adapted to underlie and bear outwardly against the other said free end connected to said fulcrum.

5. A surgical clamp, comprising: a member having a pair of elongate, resilient, longitudinally bowed arms connected at one end by a hinge portion and terminating in a pair of cooperating gripping jaws at the other end thereof, and a fulcrum joining said arms at a point spaced from both ends thereof, one of said arms being split at a point between said hinge portion and said fulcrum to form two journable free ends, one said free end connected to said hinge portion being adapted to underlie and bear outwardly against the other said free end connected to said fulcrum, and a pin formed in one of said free ends adapted to engage a hole in the other of said free ends for retaining said free ends in joined condition.

6. A surgical clamp, comprising: a member having a pair of elongate, resilient, logitudinally bowed arms connected at one end by a hinge portion and terminating in a pair of cooperating gripping jaws at the other end thereof and a fulcrum joining said arms at a point spaced from both ends thereof, one of said arms being split at a point between said fulcrum and said hinge portion to form two joinable free ends, and a mortise formed in one of said free ends and a flaring tenon formed in the other said free end, said tenon dovetailing with said mortise to join said free ends.

7. In combination, a surgical clamp comprising a unitary member having a pair of elongate, resilient, longitudinally bowed arms connected at one end by a hinge portion and terminating in a pair of cooperating gripping jaws at the other end thereof and a fulcrum joining said arms at a point spaced from both ends thereof, one of said arms being split at a point between said fulcrum and said hinge portion to form two joinable free ends, sterilized and sealed within a sterile package.

8. A surgical clamp comprising a unitary member having a pair of joinable, elongated, resilient, longitudinally bowed arms free of internal stress when not joined and internally stressed when joined, said arms terminating at an end in a pair of cooperating gripping jaws movable to the opened and closed conditions for gripping an object with pre-set compression only when said arms are internally stressed, and having means on said arms spaced from said jaws for joining said arms when the clamp is to be used; and an integral fulcrum joining said arms at a point between said jaws and said arm joining means, said gripping jaws movable about said fulcrum to the open condition to receive the object to be gripped when said internally stressed arms are pressed, and said gripping jaws movable about said fulcrum to the closed condition to grip the object therebetween when the pressure pressing upon said arms is removed.

9. The surgical clamp described in claim 8 in which a clip is provided on one of said arms spaced from said jaws for releasably holding ligatures placed around said unitary member.

10. A surgical clamp of the character described in claim 8, in which the object engaging surfaces of said jaws are roughened.

11. A surgical clamp of the character described in claim 8, in which the object engaging surface of one opposing jaw is provided with a projection adapted to mate with a recess formed in the object engaging surface of the other of said opposing jaws when said jaws are in the closed position.

12. A surgical clamp of the character described in claim 8, in which the object engaging surface of each of said opposing jaws is provided with a recess.

13. A surgical clamp of a size to permit easy handling by the human hand and to be comfortably and firmly gripped between the thumb and index finger of such hand comprising: a unitary member having a pair of joinable elongated, resilient, longitudinally bowed arms free of internal stress when not joined and internally stressed when joined, said arms terminating at an end in a pair of cooperating gripping jaws movable to the opened and closed conditions for gripping an object with pre-set compression only when said arms are internally stressed, and having means on said arms spaced from said jaws for joining said arms when the clamp is to be used; and an integral fulcrum joining said arms at a point between said jaws and said arms joining means, said gripping jaws movable about said fulcrum to the open condition to receive the object to be gripped when said internally stressed arms are pressed toward each other by the thumb and index finger, and said gripping jaws moving about said fulcrum to the closed condition to grip the object therebetween when the pressure exerted by the index finger and thumb upon said arms is removed.

References Cited

UNITED STATES PATENTS

| | | | |
|---|---|---|---|
| 2,885,758 | 5/1959 | Russo et al. | 24—255 |
| 2,887,110 | 5/1959 | Roeschmann | 128—334 X |
| 1,400,653 | 12/1921 | Barbour. | |
| 1,940,351 | 12/1933 | Howard | 128—326 |
| 2,895,478 | 7/1959 | Post | 128—334 |
| 2,988,314 | 6/1961 | Urich | 24—137 X |
| 3,037,619 | 6/1962 | Stevans | 206—63.3 |
| 3,043,902 | 7/1962 | Klein | 24—81 X |

FOREIGN PATENTS

| | | |
|---|---|---|
| 418,177 | 8/1925 | Germany. |
| 81,549 | 10/1920 | Austria. |
| 135,473 | 6/1920 | Great Britain. |

LOUIS G. MANCENE, *Primary Examiner.*

RICHARD A. GAUDET, *Examiner.*

G. E. McNEILL, *Assistant Examiner.*